Oct. 25, 1932.  S. S. KURTZ, JR  1,883,973
UNION OF RUBBER TO METAL
Filed March 2, 1928

Inventor
Stewart S. Kurtz Jr.

By

Attorney

Patented Oct. 25, 1932

1,883,073

UNITED STATES PATENT OFFICE

STEWART S. KURTZ, JR., OF AKRON, OHIO, ASSIGNOR TO THE GOODYEAR TIRE & RUBBER COMPANY, OF AKRON, OHIO, A CORPORATION OF OHIO

UNION OF RUBBER TO METAL

Application filed March 2, 1928. Serial No. 258,665.

This invention relates to methods for uniting rubber and metal. It has for one of its objects the provision of a substance which adheres tenaciously both to metal and rubber to effect a permanent bond therebetween. A further object of the invention is to provide a method that involves the vulcanization of the rubber in the presence of certain metallic salts, thereby to secure a strong and permanent union between the metal and the rubber. Other objects will be apparent as the description of the invention proceeds.

Two methods have heretofore commonly been used in order to unite rubber and metallic surfaces. One method consists in first plating the metallic surface with a thin layer of brass by the electro deposition of copper and zinc thereon. The rubber is then pressed firmly into contact with the brass coating and subjected to a relatively long cure at a comparatively high temperature.

Another method for effecting the same purpose consists in applying a coating or layer of rubber containing a high percentage of sulphur to a metallic surface, for example, to base bands or rims such as those employed as seats for solid rubber tires. A layer of rubber, such as tread stock, is next superposed upon the first mentioned layer, which is relatively hard and inextensible, and the whole is subjected to the action of a comparatively high pressure and temperature for a considerable period of time.

Both of these methods are objectionable, in part because their use necessitates extremely accurate control of all of the conditions existing during the process. If such control is not exercised, poor unions are obtained.

Figure 1:
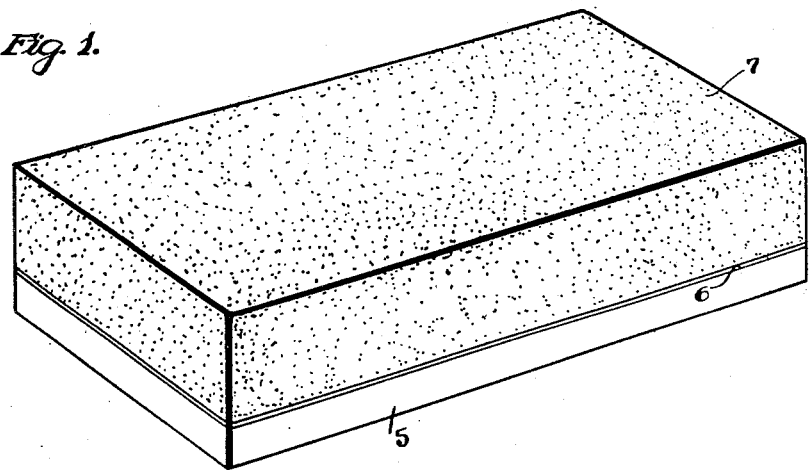
Figure 2:
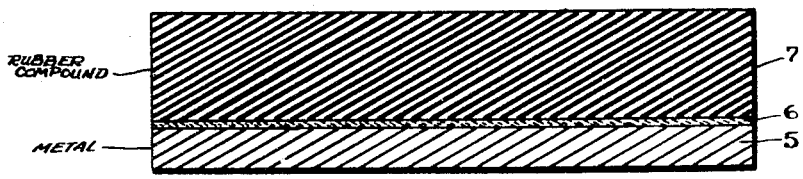

This invention involves the discovery that a union may readily be brought about between metal and rubber if a small amount of a copper or cobalt salt is spread upon the surface of either the rubber or the metal prior to the application of heat and pressure for purposes of vulcanization. For a better understanding of the invention, reference may now be had to the accompanying drawing, forming a part of the specification, in which, Figure 1 is a perspective view showing a sheet of rubber secured to a metallic plate in accordance with my invention; and Figure 2 is a cross-sectional view of the embodiment of the invention disclosed in Figure 1.

In practicing the invention, a metallic body, for example, a plate 5 of soft-steel containing approximately .096 percent of carbon, .04 percent of sulphur, .44 percent of manganese and .02 percent of phosphorus, is coated thinly with a layer of cement 6 comprising a 5 percent solution of a copper or cobalt oleate in benzene. The cement is applied with a brush, spray or by any other convenient method. The layer of the oleate solution is permitted to dry for a period of approximately ten minutes and is then coated with a layer of rubber cement containing approximately 3.2 percent of solids. The latter coating is permitted to stand for a period of approximately one-half hour, after which the surface thereof is moistened with a convenient rubber solvent, such as benzene or gasoline.

A layer of rubber 7 consisting of raw rubber compounded with the desired quantities of sulphur, pigments, accelerators, etc., is then pressed upon the moistened surface of the cementing layer. The article thus formed is placed in a mold and cured at a temperature corresponding to that of steam under forty pounds pressure for a period of approximately two and one-half hours and with the application of a positive pressure.

The invention is not limited to the employment of the oleate salts of copper and cobalt to obtain adhesion between rubber and metal. Similar results may be obtained by the use of the stearates, palmitates and other copper or cobalt salts of various unsaturated acids of the olefin series and also acids of the paraffin series, such as the salts produced by the interaction of acetic acid and copper. Adhesion of rubber to metal may also be obtained by the employment of a rubber cement containing copper or cobalt salts of mercaptobenzothiazole as an adhesive. Effective adhesion may also be obtained by the employment of inorganic salts, such as copper or cobalt chloride. This is particularly true if the union is not exposed to the atmosphere.

In order to obtain a union of rubber to metal by the employment of copper chloride, it is preferable to mix one volume of a two and one-half percent dispersion of cuprous chloride ($Cu_2Cl_2$) in alcohol with two volumes of benzene. This solution is poured with vigorous agitation into two volumes of diluted rubber cement. The compounds so prepared may be applied to metal surfaces, such as a mild steel, with a brush or by spraying. A rubber stock containing suitable quantities of sulphur and other ingredients desired is pressed upon the surface and then cured by the application of heat and pressure.

It is also possible to obtain a union of rubber to metal by dusting the surfaces to be secured together with powdered copper or cobalt salts and then subjecting the rubber to cure in the same manner as in the examples previously described. In this case, the rubber absorbs the salt directly and a layer of compound capable of adhering to the metal is thus produced when the stock is subjected to heat and pressure during vulcanization.

Adhesion may likewise be obtained by intermixing a copper or cobalt salt, such as cuprous chloride ($Cu_2Cl_2$) or cupric chloride ($CuCl_2$), with a binder such as a bakelite varnish and then coating one of the surfaces to be secured together therewith. The rubber stock is then pressed upon the metal and subjected to cure in the ordinary manner.

It will be apparent from the preceding description that the invention involves a relatively simple method whereby excellent adhesion of rubber to metal may be obtained.

Although only the preferred forms which the invention may assume have been described, it will be apparent to those skilled in the art that the invention is not limited thereto but that various modifications may be made therein without departing from the spirit thereof or from the scope of the appended claims. It is intended that the patent shall cover, by suitable expression in the appended claims, whatever features of patentable novelty reside in the invention.

What I claim is:

1. A method of securing rubber surfaces to metallic surfaces which comprises coating one of the surfaces with a material containing an organic salt of copper or cobalt, bringing the surfaces together and applying heat and pressure thereto.

2. A method of securing a union of rubber to metal which comprises coating one of the surfaces to be secured with a material containing a copper or cobalt salt of an unsaturated organic acid, intimately engaging the surfaces with each other, and subjecting the rubber to heat and pressure.

3. A method of treating rubber which comprises causing its surfaces to adhere to an iron-containing body by the action of a copper or cobalt salt while the surfaces are held in contact by pressure and are subjected to heat.

4. A method of treating rubber which comprises causing a surface thereof to adhere to an iron-containing body by the action of an organic salt of copper or cobalt while the surfaces are held in contact by pressure and while they are subjected to heat.

5. A method of treating rubber which comprises causing a surface thereof to adhere to an iron-containing body by the action of a copper or cobalt salt of an unsaturated fatty acid while the surfaces are held in contact by pressure and while they are subjected to heat.

6. A method of treating rubber which comprises causing a surface thereof to adhere to an iron-containing body by the action of a copper or cobalt oleate while the surfaces are held in contact by pressure and while they are subjected to heat.

7. An article comprising a body of iron-containing material and a body of rubber-containing material united to the first mentioned body by means of an intermediate layer of material containing a salt of copper or cobalt.

8. An article comprising a body of iron-containing material and a body of rubber-containing material united to the first mentioned body by means of an intermediate layer of material containing an organic salt of copper or cobalt.

9. An article comprising a body of iron-containing material and a body of rubber-containing material united to the first mentioned body by means of an intermediate layer of material containing a salt of an unsaturated hydrocarbon acid and copper or cobalt.

10. An article comprising a body of iron-containing material and a body of rubber-containing material united to the first mentioned body by means of an intermediate layer of material containing an oleate salt of copper or cobalt.

11. A method of forming a composite body consisting of a ply of rubber and a ply of steel comprising disposing a film of an organic salt of copper between the two plies and then subjecting the whole to heat and pressure.

12. A method of securing rubber to metal which comprises uniting the same by means of a cement containing copper oleate and subjecting the rubber to vulcanization under heat and pressure.

13. A method of securing rubber to metal which comprises cementing those materials together by means of a cement containing a material selected from a group comprising oleates, palmitates and stearates of copper and cobalt, and subjecting the rubber to vulcanization under heat and pressure.

14. A method of securing rubber to ferrous metal comprising the steps of dispersing a salt of copper or cobalt in a rubber cement, interposing a layer of the cement between the rubber and the ferrous metal, and uniting the whole by the application of heat and pressure.

15. A method of securing rubber to ferrous metal comprising the steps of applying to at least one of the surfaces to be secured together a rubber cement containing a salt of copper or cobalt in which the valence of the copper or cobalt is two and thereafter subjecting the whole to the action of heat and pressure.

16. A method of securing rubber to ferrous metal comprising interposing between the rubber and the metal a body of rubber cement having an organic copper or cobalt salt dispersed therein.

17. A method of securing rubber to ferrous metal comprising the steps of coating said ferrous metal with a salt of copper or cobalt dispersed in a liquid vehicle, applying a body of rubber cement over said coating, superimposing on said body of rubber cement the rubber to be secured to said ferrous metal and vulcanizing the rubber.

18. A method of securing rubber to ferrous metal comprising the steps of coating said ferrous metal with a salt of copper or cobalt, applying a rubber cement over said coating, superimposing the rubber to be secured to said ferrous metal and vulcanizing.

In witness whereof, I have hereunto signed my name.

Signed at Akron, in the county of Summit and State of Ohio, U. S. A., this 29th day of February, 1928.

STEWART S. KURTZ, Jr.